Patented Sept. 7, 1937

2,092,696

UNITED STATES PATENT OFFICE 2,092,696

MANUFACTURE OR TREATMENT OF ARTIFICIAL MATERIALS

Henry Dreyfus, London, England

No Drawing. Application May 28, 1935, Serial No. 23,864. In Great Britain June 30, 1934

14 Claims. (Cl. 8—20)

This invention relates to the manufacture and treatment of artificial filaments, threads, fibres, ribbons, films and like materials by processes involving the saponification of materials made of or containing cellulose acetate or other esters of cellulose and particularly organic esters of cellulose.

This invention is a continuation-in-part of the invention described in application S. No. 709,335 filed February 1, 1934.

The agents generally used in the saponification of such materials are caustic soda or other inorganic alkaline compounds. The use of such saponifying agents, however, is attended by certain disadvantages unless special precautions are taken, and much research has been carried out in the attempt to find more suitable agents.

According to the present invention, organic esters of cellulose are saponified by treatment with alkaline salts of organic bases. Most advantageously the bases employed are the mono-, di- or poly-amino bases corresponding with the lower hydrocarbons of the aliphatic series, for example mono-methylamine, dimethylamine, trimethylamine, ethylamine, diethylamine, propylamine, ethylene diamine, mono-methyl ethylene diamine, symmetrical dimethyl ethylene diamine, propylene diamine, triamino propane, triethanolamine, $\alpha\gamma$-diamine-$\beta$-propanol and tetra-methyl or ethyl ammonium hydroxide. The invention does not, however, exclude the use of other bases, for example amylamine, hexylamine, piperidine or other heterocyclic bases, and cyclo-hexylamine or other cyclic bases. It is advantageous to employ bases containing at least one amino group which is either unsubstituted or is at the most mono-substituted.

As examples of suitable agents for the purpose of the present invention may be mentioned methylamine carbonate, methylamine silicate, the di- and tri- mono-methylamine phosphates, ethylamine carbonate, ethylamine silicate, the di- and tri- monoethyl-amine phosphates, ethylene diamine carbonate, ethylene diamine silicate and tetra-ethyl ammonium silicate and similar compounds of other bases referred to above. These salts may be prepared by any suitable method. For instance a solution of the hydrochloride or other soluble salt of the base may be mixed with a solution of a sodium or other salt of the weak acid, for example sodium silicate. Instead of the carbonates of the bases, for example ethylene diamine carbonate, the corresponding substituted carbaminic acids may be employed or salts of such acids. For example instead of ethylene diamine carbonate the corresponding carbaminic acid, namely N-$\beta$-aminoethyl-carbaminic acid, or the sodium or other salts thereof may be employed. For the purposes of the present invention these carbaminic acids are considered to be the equivalents of the carbonates, and it is to be understood that the claims, in calling for salts of inorganic acids, include both the carbonates and the carbaminic acids and their salts. In addition to the salt of the base there may be present in the saponifying medium a proportion of the corresponding free base and/or of other organic bases. Such additions are particularly advantageous when it is required to effect a relatively high degree of saponification and/or when saponification is to be effected at high speed. Mineral saponifying agents may also be applied in conjunction with the salts of the invention or subsequently thereto, with a view to increasing the rate of saponification. When such agents are applied in conjunction with the salts of the invention they should preferably be present only in small amount e. g. 1 or 2% to 4 or 5% caustic soda or the equivalent of other mineral alkali. When such agents are applied successively they may be present in similar concentrations or in higher concentration.

Saponification may be effected with the aid of the agents of the invention without damaging the materials or decreasing their tensile strength, in fact the treatment may even increase the tenacity. Moreover, the extensibility of the materials may also be increased as a result of the treatment.

The saponifying action of the salts of the bases may be suitably accelerated by means of certain metals. For example the presence of copper in the bath or upon the material considerably accelerates the saponifying action of the new saponifying agents. The copper may be added to the bath as a soluble or insoluble compound, or may be added as the metal itself, for example copper sulphate or copper oxide may be dissolved in or suspended in the bath or the bath may take up copper from copper metal added as such. Many of the salts of the bases with weak acids are capable of dissolving directly insoluble copper compounds. For example ethylamine carbonate solution readily dissolves basic copper carbonate. In a similar way other metals or metal compounds, for example zinc, silver or nickel, may be used to accelerate the saponifying action of the new agents, and reference is made broadly in this connection to U. S. application S. No. 756,284 filed 6th December 1934.

One advantage of the new agents as compared with the corresponding bases themselves is that the salts are in general much less volatile than are the bases, and in consequence solutions of the salts may be used at higher temperatures without substantial volatilization. However, where the temperature or other conditions employed for the saponification are such that substantial evaporation is liable to take place, the bath used for the treatment may be covered with a layer of oil or other liquid of low volatility substantially immiscible with the bath so as to prevent or minimize volatilization. If desired, the materials may be carried into and out of the bath without contacting with the oil or similar layer, for example by arranging partitions or rollers dipping below the surface of the saponifying medium so as to localize the oil or similar layer.

The saponifying agents of the present invention may be applied to the materials in solution in water, alcohol or aqueous alcohol. Simple aqueous saponifying baths are, however, preferred. The bath may, however, contain in addition to the water and/or alcohol a swelling agent or solvent for the cellulose derivative under treatment, for example acetone or other ketone, dioxane, methylene ethylene ether or similar cyclic ether.

The esters treated may be in the form of filaments, threads, yarns, ribbons or the like or fabrics containing such threads and the like or of ribbons or films. The ester of cellulose employed may be of normal or low viscosity or may be of high viscosity. For instance the viscosity of the cellulose acetate may be of the order of 10-20, 20-30, 30-50, 100, 200 or even higher as measured by comparing the viscosity of a 6% solution of the acetate in acetone at 25° C. with that of glycerine at the same temperature taken as a standard of 100. Materials of exceptionally high tenacity and also of good extension may be obtained by saponifying cellulose ester materials which have been dry spun and have been stretched considerably subsequent to their production, for example while under the action of a suitable swelling medium, or which have been wet spun and have been stretched considerably during the wet spinning operation and/or as a subsequent treatment. The stretch imparted may, for example, be 200-300% or even more than 500% of the original length of the materials. Such materials, where stretched as an after-treatment or in the course of their production by a wet spinning process, may have an initial tenacity of 2.5, 3, 3.5 grams per denier or even more, and, as previously indicated, this tenacity may even be increased as a result of the treatment according to the invention.

The invention further includes carrying out a stretching treatment during or subsequent to the saponification characteristic of the invention. This aspect of the invention is particularly important where relatively low degrees of saponification are brought about. For example when a cellulose acetate is being saponified so as to bring about a loss of acetyl value of the order of 10-15% or 20%, stretch may be applied to the material during the saponification. The saponifying agent may itself facilitate this stretch or an additional swelling agent may be used for the purpose. Even where the ultimate degree of saponification is considerably larger, for example corresponding to elimination of 30 or 40-50% of the ester groups up to complete saponification, stretching may be effected during the early stages of the saponification. Again, materials which have been saponified according to the present invention to a relatively low degree may be subjected to a subsequent stretching treatment.

The saponification according to the present invention may be carried out under any suitable conditions consistent with the material not being unduly swollen by the saponifying medium. For example methylamine carbonate or silicate may be applied at temperatures of the order of 50-60° C. up to 80° C. or more. Such a treatment is particularly suitable for a substantial degree of saponification. Where a much lower degree of saponification is required the temperature may be adjusted accordingly. For example the temperature may be reduced to 30-50° C.

The temperature and concentration should preferably be such that the desired degree of saponification can be effected in a treatment lasting a relatively short time, e. g. 2-3 minutes or less. On the other hand, more prolonged treatments are not excluded and may even be necessary in the case of the weaker bases. Rapid saponification, apart from other advantages, enables the treatment to be carried out continuously and under conditions in which uniformity as between a number of yarns or the like to be subjected to the same treatment can more easily be ensured than if a batch treatment be adopted. Thus, even when saponification takes 4 or 5 minutes, it may be of advantage to employ a continuous (bath) treatment. Treatments lasting considerably longer than this, for instance from 10 or 15 minutes up to several hours are best avoided, but if for particular reasons they are employed, a batch method should be used. As previously indicated, the presence of copper or other metals or metal compounds in the bath has the effect of accelerating the saponification.

Preferably, saponification is effected by means of a bath treatment, and where the process is sufficiently rapid, it is of advantage to pass the materials continuously through the bath in the course of their passage between two points. This is the preferred method, whether the materials treated are in fabric form or in the form of threads, ribbons or the like. Threads and like materials are most advantageously treated in warp formation. Thus, for example, a number of threads may be drawn off from a creel, passed through a reed, and then in the form of a warp, or sheet of running threads, over a roller, which may conveniently dip into a bath containing the saponifying medium, through the bath, through a further reed and over a further roller, from which they may be wound in suitable form, preferably after undergoing washing and drying treatments and/or any other treatment which it is desired to effect after saponification. By treating the materials in warp formation it is possible to ensure that each thread is subjected to identically the same treatment as its neighbours. To ensure uniformity of tension during the process all rollers, guides or like devices adapted to control or modify the speed of travel of the materials should extend right across the warp or sheet of threads. The speed at which the materials pass through the bath should preferably be such that the desired degree of saponification is effected by the time the materials leave the bath. During their passage through the bath the materials may be under applied tension or simply under the tension introduced by shrinkage of the materials, or again means may be taken to reduce the tension, for example by causing the speed of travel of the materials to diminish along their path. It is desirable in order to utilize the full length of the saponifying bath to wet out the materials thoroughly either on entering the saponifying bath or before entering. For this purpose the yarns may be carried into a short wetting out bath in which they are carried through a pair of nip rollers, one at least of which dips into a wetting out liquid. The nip rollers are preferably so arranged that one is in advance of the other, so that their rotation causes a trough of liquid to collect in the nip of the rollers. By this means very efficient wetting out may be obtained. The rollers may be metal rollers or may be covered with fabric or with rubber or similar materials to assist wetting out. The wetting medium may be water, or may be an aqueous solution of a wetting agent, as for example the soaps, for example sodium, potassium or ammonium oleates, palmitates or stearates, sulphonated soaps, for example Turkey red oil or Monopol soap, the naphthalene sulphonic acid wetting agents, and particularly the propyl and butyl naphthalene sulphonic acids or their salts, or the ω-aminoalkylamides of oleic, stearic, palmitic or other fatty acids. A small proportion of the saponifying agent itself may be included in the wetting out bath.

As indicated above, batch methods may be employed and may even in some circumstances be preferable to continuous methods such as that described above. Thus, for example, the materials in hank form may be suspended from rods which are caused to traverse the length of the bath and at the same time to rotate so as to expose each portion of the yarn to the same depth in the bath for the same period.

Although the above methods are to be preferred, other methods of effecting saponification according to the invention may be employed. Thus, for example, the saponifying medium may be applied to the materials, for example during a bath treatment or by padding methods under such conditions that saponification, or the whole of the saponification to be effected, does not occur during the application, and the materials may be passed continuously from the point of application of the saponifying agent through a heated zone or in contact with a heated surface so as to bring about or complete the saponification required. Processes in which this method is applied in connection with mineral saponifying agents are described in U. S. Patents Nos. 1,884,622 and 1,884,623.

The extent of the saponification may vary considerably depending upon the object in view. An affinity for the cotton colours may be acquired by the process of the invention with a very small loss in acidyl content, such as 25% or even less, which is remarkable since such low degrees of saponification are in general only effective in conferring affinity for the cotton colours when the saponification is mainly superficial, which does not appear to be the case here. The invention is not limited to such small degrees of saponification, or indeed to any particular degree. Thus, for example, the loss of acidyl content may be from 10–20% or even less than 10%, or may be of the order of 50% or more up to complete saponification. Again, the range between 40% loss of acidyl content and 50% has been found a useful one.

The following examples illustrate the invention:—

*Example 1*

A bath is made up by passing methylamine into a 10 to 15% aqueous solution of colloidal silicic acid until the total methylamine content of the bath is 25 to 30%. The silicic acid solution may conveniently be made by decomposing sodium silicate, preferably a super-silicated sodium silicate, by means of hydrochloric acid, and subjecting the resulting solution to dialysis.

Cellulose acetate threads are drawn in warp formation through the bath containing methylamine silicate and free methylamine, prepared as described above, at such a rate as to effect the desired saponification, and are then passed through a washing bath and over drying rollers to suitable collecting means.

*Example 2*

The process is carried out as in Example 1 except that the bath is made up by passing carbon dioxide into a 15 to 25% aqueous solution of methylamine until the solution is saturated with carbon dioxide and adding a further 5 to 10% on the bath, of methylamine.

*Example 3*

The process is carried out as in Example 1 except that the bath is made up by adding to a 25 to 35% aqueous solution of methylamine a sufficient quantity of phosphoric acid to convert 25 to 50% of the methylamine present into the tri-(monomethylamine)-phosphate.

In the above example, for monomethylamine there may be substituted ethylamine or ethylene diamine. The treatment may also with advantage be carried out under pressure, for example a pressure between 5 and 10 atmospheres, using apparatus such as is described in U. S. applications S. Nos. 11,080 filed 14th March 1935, and 17,242 filed 19th April 1935.

While the invention is of greatest importance in relation to commercial acetone-soluble cellulose acetate, it may be applied to the treatment of materials made of other organic esters of cellulose i. e. other cellulose esters containing organic acidyl groups, for instance cellulose formate, cellulose proprionate or cellulose butyrate. The organic esters may be either simple esters as in the case of cellulose acetate, or mixed esters, for instance cellulose nitro-acetate or mixed ether-esters of cellulose, for example oxyethyl cellulose acetate or ethyl cellulose acetate. The esters may be present in the threads, yarns or other materials either alone or mixed with each other or mixed with other materials not deleteriously affected by the treatment, for instance natural or artificial cellulosic materials.

The process of the invention as compared with saponification by caustic alkali or other inorganic alkaline saponifying agents, besides improving the serimetric properties of the material may have other valuable effects. Thus by partial saponification an affinity for cotton dyes may be imparted to the material without loss of affinity for cellulose ester dyes, for example dyes of the dispersed insoluble type. Again, cellulose acetate materials may be rendered insoluble in acetone or even in aqueous acetone by a saponification involving a relatively small loss in weight. The process moreover raises the safe ironing point of the materials and may at the same time lower the scorching point, so that in ironing and calendering operations warning that the iron or calender is too hot may be received before serious damage is done to the material.

If desired, the materials obtained as a result of the saponification process may be treated so as to effect shrinkage. Special shrinking agents may, if desired, be used to produce this effect, and in this connection reference is made broadly to the processes described in U. S. applications S. Nos. 607,667 filed 26th April 1932, 609,255 filed 4th May 1932, and 611,240 filed 13th May 1932. Uniform shrinkage for the purpose of increasing extension is most useful when applied to yarns which have undergone a relatively high degree of stretch prior to saponification. The shrinking treatment is preferably applied after saponification and to materials in which the degree of saponification is relatively small, for example up to 10 or even 20% loss in weight. When a high degree of saponification or substantially complete saponification has been carried out, swelling agents for cellulose may be employed. Shrinkage is most important in relation to the treatment of materials which either before, during or subsequent to saponification have been subjected to considerable stretch.

As previously indicated, the use of the agents of the present invention presents very considerable advantage as compared with the use of inorganic alkaline saponifying agents. However, some of the advantages may be obtained by employing the agents of the present invention together with caustic soda, caustic potash, sodium silicate or other alkalies or alkaline agents. Preferably such additional agents are employed in relatively small quantities, for example in a concentration in the case of caustic soda of under 2% on the bath, and preferably under 1%.

What I claim and desire to secure by Letters Patent is:—

1. Process for saponifying filaments, threads, fibres, ribbons, films and like materials having a basis of organic ester of cellulose, which comprises treating the materials with a liquid medium containing an alkaline salt of an organic acid with a water-soluble nitrogenous base in which each carbon atom that is directly attached to a nitrogen atom is directly attached to three other atoms apart from said nitrogen atom.

2. Process for saponifying filaments, threads, fibres, ribbons, films and like materials having a basis of organic ester of cellulose, which comprises treating the materials with an aqueous medium containing an alkaline salt of an inorganic acid with a water-soluble nitrogenous base in which each carbon atom that is directly attached to a nitrogen atom is directly attached to three other atoms apart from said nitrogen atom.

3. Process for saponifying filaments, threads, fibres, ribbons, films and like materials having a basis of organic ester of cellulose, which comprises treating the materials with an aqueous medium containing an alkaline salt of an organic acid with a lower aliphatic amine.

4. Process for saponifying filaments, threads, fibres, ribbons, films and like materials having a basis of cellulose acetate, which comprises treating the materials with an aqueous medium containing an alkaline salt of an organic acid with a water-soluble nitrogenous base in which each carbon atom that is directly attached to a nitrogen atom is directly attached to three other atoms apart from said nitrogen atom.

5. Process for saponifying filaments, threads, fibres, ribbons, films and like materials having a basis of cellulose acetate, which comprises treating the materials with an aqueous medium containing an alkaline salt of an organic acid with a lower aliphatic amine.

6. Process for saponifying filaments, threads, fibres, ribbons, films and like materials having a basis of cellulose acetate, which comprises treating the materials with an aqueous medium containing an alkaline salt of an organic acid with methylamine.

7. Process for saponifying filaments, threads, fibres, ribbons, films and like materials having a basis of cellulose acetate, which comprises treating the materials with an aqueous medium containing an alkaline salt of an organic acid with ethylene diamine.

8. Process for saponifying filaments, threads, fibres, ribbons, films and like materials having a basis of organic ester of cellulose, which comprises treating the materials with an aqueous medium containing an alkaline salt of a water-soluble nitrogenous base in which each carbon atom that is directly attached to a nitrogen atom is directly attached to three other atoms apart from said nitrogen atom with a weak mineral acid.

9. Process for saponifying filaments, threads, fibres, ribbons, films and like materials having a basis of organic ester of cellulose, which comprises treating the materials with an aqueous medium containing an alkaline salt of an organic acid with a water-soluble nitrogenous base in which each carbon atom that is directly attached to a nitrogen atom is directly attached to three other atoms apart from said nitrogen atom and, in addition to the amount of free base derived by hydrolysis of the salt, a further quantity of said nitrogenous base in the free state.

10. Process for saponifying filaments, threads, fibres, ribbons, films and like materials having a basis of organic ester of cellulose, which comprises treating the materials with an aqueous medium containing a salt of an organic acid with a water-soluble nitrogenous base in which each carbon atom that is directly attached to a nitrogen atom is directly attached to three other atoms apart from said nitrogen atom in the presence of a mineral saponifying agent.

11. Process for saponifying filaments, threads, fibres, ribbons, films and like materials having a basis of cellulose acetate, which comprises treating the materials with an aqueous medium containing a salt of an organic acid with a water-soluble nitrogenous base in which each carbon atom that is directly attached to a nitrogen atom is directly attached to three other atoms apart from said nitrogen atom in the presence of a mineral saponifying agent.

12. Process for saponifying filaments, threads, fibres, ribbons, films and like materials having a basis of organic ester of cellulose, which comprises treating the materials with an aqueous medium containing a salt of an organic acid with tetramethyl ammonium hydroxide in the presence of a mineral saponifying agent.

13. Process for saponifying filaments, threads, fibres, ribbons, films and the like having a basis of cellulose acetate, which comprises treating the materials with an aqueous medium containing a salt of a lower aliphatic amine with an acid selected from the group consisting of silicic, carbonic and phosphoric acids.

14. Process for saponifying filaments, threads, fibres, ribbons, films and like materials having a basis of cellulose acetate, which comprises treating the materials with an aqueous bath containing a salt of methylamine with an acid selected from the group consisting of silicic, carbonic and phosphoric acids, and also containing excess of free methylamine.

HENRY DREYFUS.

CERTIFICATE OF CORRECTION.

Patent No. 2,092,696. September 7, 1937.

HENRY DREYFUS.

It is hereby certified that error appears in the printed specification of the above numbered patent requiring correction as follows: Page 4, first column, lines 48, 67, 73 and second column, lines 7, 13, 19, 35, 47, 57 and 67, claims 1, 3, 4, 5, 6, 7, 9, 10, 11 and 12 respectively, for the word "organic" read inorganic; and that the said Letters Patent should be read with these corrections therein that the same may conform to the record of the case in the Patent Office.

Signed and sealed this 31st day of May, A. D. 1938.

Henry Van Arsdale,
Acting Commissioner of Patents.

(Seal)